United States Patent
Jouret et al.

(10) Patent No.: US 9,319,567 B2
(45) Date of Patent: Apr. 19, 2016

(54) VIDEO FEEDBACK OF PRESENTER IMAGE FOR OPTIMIZING PARTICIPANT IMAGE ALIGNMENT IN A VIDEOCONFERENCE

(71) Applicant: Cisco Technology, Inc., San Jose, CA (US)

(72) Inventors: Guido Karel Maria Jouret, Mountain View, CA (US); Chris Andrew Dunn, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 13/968,990

(22) Filed: Aug. 16, 2013

(65) Prior Publication Data
US 2015/0049156 A1   Feb. 19, 2015

(51) Int. Cl.
*H04N 7/14*   (2006.01)
*H04N 5/21*   (2006.01)
*H04N 7/18*   (2006.01)
*H04N 7/15*   (2006.01)

(52) U.S. Cl.
CPC ............ *H04N 5/21* (2013.01); *H04N 7/141* (2013.01); *H04N 7/15* (2013.01); *H04N 7/18* (2013.01)

(58) Field of Classification Search
CPC ............ H04N 7/18; H04N 5/21; H04N 7/141
See application file for complete search history.

(56) References Cited

U.S. PATENT DOCUMENTS 8,392,503 B2   3/2013   Kuhlke et al.
2012/0320142 A1*  12/2012   Baird .................... 348/14.03

FOREIGN PATENT DOCUMENTS

WO   00/60863 A1   10/2000

OTHER PUBLICATIONS

"MEMS Gyroscope", [online], [retrieved on Jul. 26, 2013]. Retrieved from the Internet: <UTL: http://www.ifixit.com/Teardown/iPhone+4+Gyroscope+Teardown/3156/1?singlePage>, pp. 1-7.
Baker et al., "Avoidong Nostril-cam and Postage-stamp People in Mobile Video Conferences", [online], [retrieved on May 24, 2013]. Retrieved from the Internet: <URL: http://sigops.org/sosp/sosp11/workshops/mobiheld/04-baker.pdf], pp. 1-5.

* cited by examiner

*Primary Examiner* — Amal Zenati
(74) *Attorney, Agent, or Firm* — Leon R. Turkevich

(57) ABSTRACT

In one embodiment, a method comprises determining that a participant image has a distorted view relative to an optimized view of a participant within a corresponding participant image frame for a web-based videoconference with a presenter; and sending, to a display of a device having generated the participant image, a distorted image of the presenter corresponding to the distorted view in the participant image frame, enabling the participant to adjust the device to minimize the distorted view.

20 Claims, 9 Drawing Sheets

US 9,319,567 B2

VIDEO FEEDBACK OF PRESENTER IMAGE FOR OPTIMIZING PARTICIPANT IMAGE ALIGNMENT IN A VIDEOCONFERENCE

TECHNICAL FIELD

The present disclosure generally relates to web-based videoconferencing systems that enable a presenter to view one or more participants via a display device.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Web-based meeting systems have proven to be a popular alternative to face-to-face meetings in person or audio-only conferencing systems such as teleconferences, webcasts, and the like. A web-based meeting system (e.g., the commercially available Cisco WebEx product by Cisco Systems, San Jose Calif.) enable a presenter to conduct a video-based meeting with one or more participants using various quality web-based computing devices, ranging from desktop-based computers to studio quality video conferencing systems (e.g., using the commercially available Cisco TelePresence system from Cisco Systems) to provide the best possible experience for participants of the web-based meeting.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
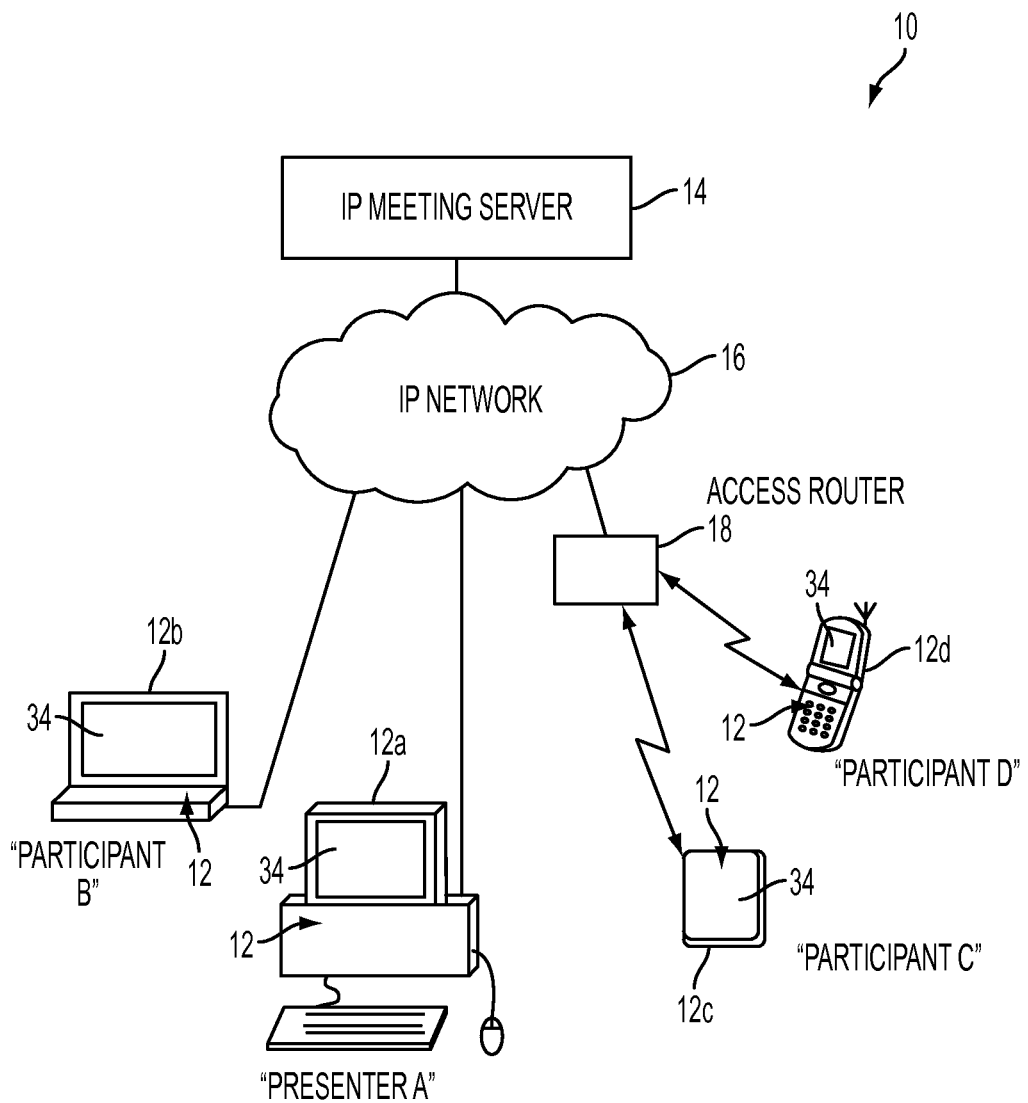
FIG. 1 illustrates an example system having an apparatus for sending a distorted image of a presenter corresponding to a distorted view of a participant image, to enable a participant to optimize the participant image in a web-based videoconference, according to an example embodiment.

In one embodiment, a method comprises determining that a participant image has a distorted view relative to an optimized view of a participant within a corresponding participant image frame for a web-based videoconference with a presenter; and sending, to a display of a device having generated the participant image, a distorted image of the presenter corresponding to the distorted view in the participant image frame, enabling the participant to adjust the device to minimize the distorted view.

In another embodiment, an apparatus comprises image detection circuitry and image generation circuitry. The image detection circuitry is configured for determining that a participant image has a distorted view relative to an optimized view of a participant within a corresponding participant image frame for a web-based videoconference with a presenter. The image generation circuitry is configured for sending, to a display of a device having generated the participant image, a distorted image of the presenter corresponding to the distorted view in the participant image frame, enabling the participant to adjust the device to minimize the distorted view.

In yet another embodiment, logic is encoded in one or more non-transitory tangible media for execution and when executed by a machine operable for: determining that a participant image has a distorted view relative to an optimized view of a participant within a corresponding participant image frame for a web-based videoconference with a presenter; and sending, to a display of a device having generated the participant image, a distorted image of the presenter corresponding to the distorted view in the participant image frame, enabling the participant to adjust the device to minimize the distorted view.

DETAILED DESCRIPTION

Particular embodiments enable a participant engaged in a web-based videoconference with a presenter to intuitively optimize an image captured by a corresponding participant device (i.e., a participant image), based on receiving a distorted image of the presenter corresponding to a determined distorted view of the participant. The particular embodiments can determine that the participant image is a "distorted view" (i.e., a substandard or sub-optimal view) relative to an optimized view within a participant image frame, and in response send to the display of the participant device a distorted image of the presenter that corresponds to the distorted view of the participant image in the participant image frame.

Hence, the distorted image of the presenter sent to the display of the participant device serves as a "mirror" of the distorted view of the participant image: this "mirroring" of the distorted view serves as feedback to the participant that enables the participant to intuitively adjust the participant device to minimize the distorted view. Hence, the example embodiments provide feedback to the participant as the participant image is improved, enabling the participant to adjust the device to minimize the distorted view and optimize the participant image within the corresponding participant image frame viewed by the presenter and/or other participants.

FIG. 1 illustrates an example system 10 that enables web-based meeting participants (e.g., "B", "C", and "D") to optimize their respective participant images based on respective received distorted images of the presenter "A", according to an example embodiment. The system 10 can include user devices 12 that can establish a web-based videoconference via a meeting server 14 that is reachable via a local area network (LAN) and/or wide area network (WAN) 16. An example network 16 can be an Internet protocol (IP)-based network such as the Internet. Each of the user devices 12 can reach the network 16, for example via a gateway 18. An example gateway 18 can be a wireless IEEE 802 compatible device such as a wired or wireless IEEE 802.11 access router, an IEEE 802.16 compatible WiMAX (Worldwide Interoperability for Microwave Access) gateway, an LTE Advanced (Long Term Evolution) based gateway, etc. Other example gateways 18 can be utilized that implement a wireless protocol promulgated by the International Telecommunication Union (ITU).

Figure 5A:
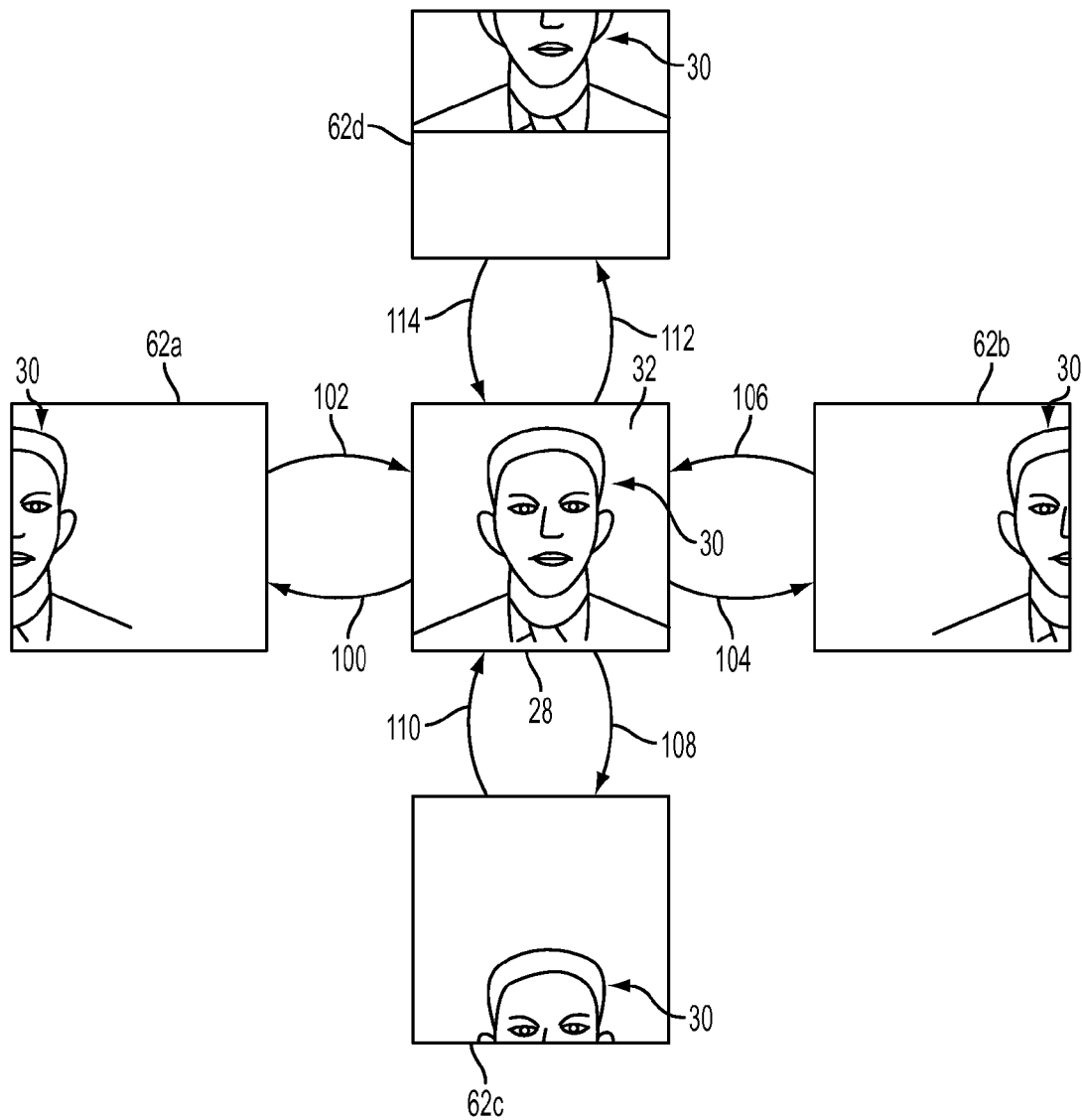
FIGS. 5A-5E illustrates example distorted images of the presenter that can be sent and displayed on a participant device, relative to an optimized view of the presenter, that enable a participant to adjust the participant device to minimize the distorted view generated by the participant device, according to an example embodiment.

As illustrated in FIG. 1, the presenter "A" and the meeting participants "B", "C", and "D" can utilize different types of user devices 12. A meeting presenter "A" typically will attempt to provide the best video quality during the web-based videoconference, for example using studio-quality camera equipment, a Telepresence endpoint (commercially available from Cisco Systems, San Jose Calif.), and/or a desktop computer 12a. As illustrated in FIG. 5A, the meeting presenter utilizing the corresponding user device (i.e., presenter device) such as the desktop computer 12a typically will place himself/herself in an optimal viewing position with respect to the video camera (26 of FIG. 3) in a well lit environment, facing the camera 26 with head, shoulders, and arms visible, and a sufficient distance from the camera designed to optimize eye contact, resulting in an optimized view 28 of the presenter 30 centered within an image frame 32. An example optimized view of a presenter or participant can be a lifelike representation of a local video on a remote system that is displaying at eight feet away on a sixty five (65) inch display screen.

The inventors have realized that a participant (e.g., "B", "C", or "D") viewing an optimized view of a presenter (e.g., "A") on a display can cause a participant to be less motivated in establishing a corresponding optimized view of the participant within a corresponding participant image frame for the web-based videoconference. To the contrary, a participant of the web-based videoconference may be less concerned with his appearance if he is not the primary presenter; further, use of a portable user device such as a laptop computer 12b, a tablet computing device (e.g., an iPad) 12c, or a wireless mobile telephony device 12d having an integrated camera can cause the corresponding user to hold the portable user device in a position that may be convenient for holding but which results in a poor image capture of the participant.

According to example embodiments, a participant (e.g., "B") can be motivated to intuitively optimize his participant image within the corresponding participant image frame in response to viewing a distorted image of the presenter "A" that mirrors the distorted view of the current participant image. Hence, the participant "B" can adjust his portable user device (e.g., 12b, 12c, or 12d) to optimize the participant image in response to the feedback received on the corresponding display 34 with respect to the distorted image of the presenter "A".

Figure 2:
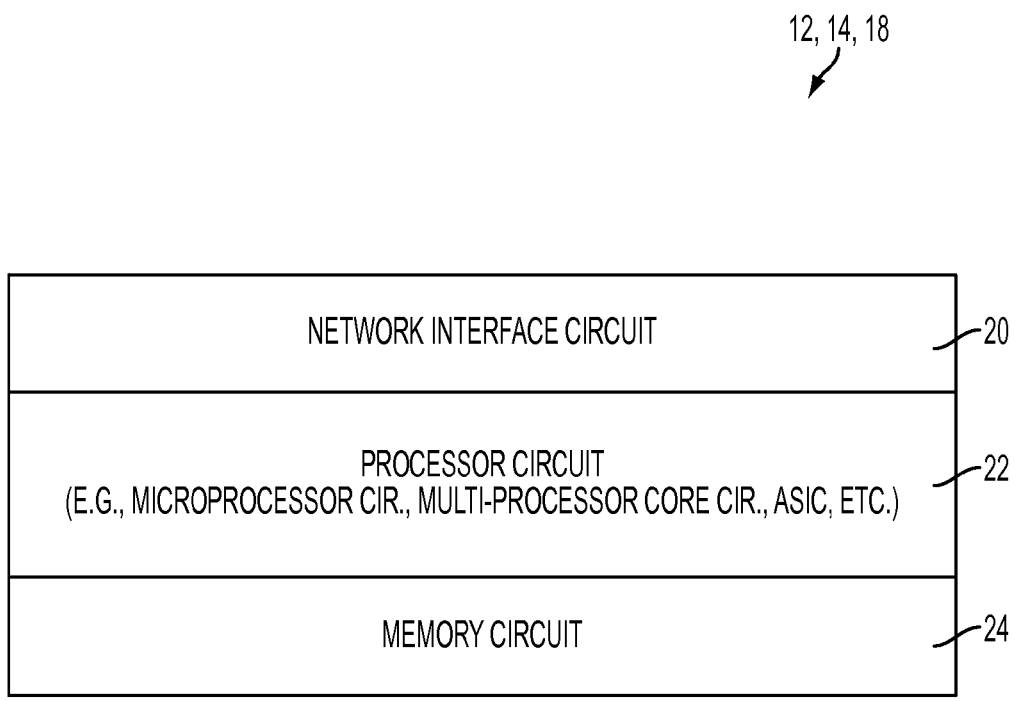
FIG. 2 illustrates an example implementation of any one of the devices of FIG. 1, including the IP meeting server, the access router, or a user device, according to an example embodiment.

FIG. 2 illustrates an example implementation of any one of the devices of FIG. 1, including any user device 12, the access router 18, and/or the IP meeting server 14, according to an example embodiment. Each device 12/14, and/or 18 is a physical machine (i.e., hardware device or apparatus) that can include a network interface circuit 20, one or more processor circuits 22, and a memory circuit 24.

Figure 3:
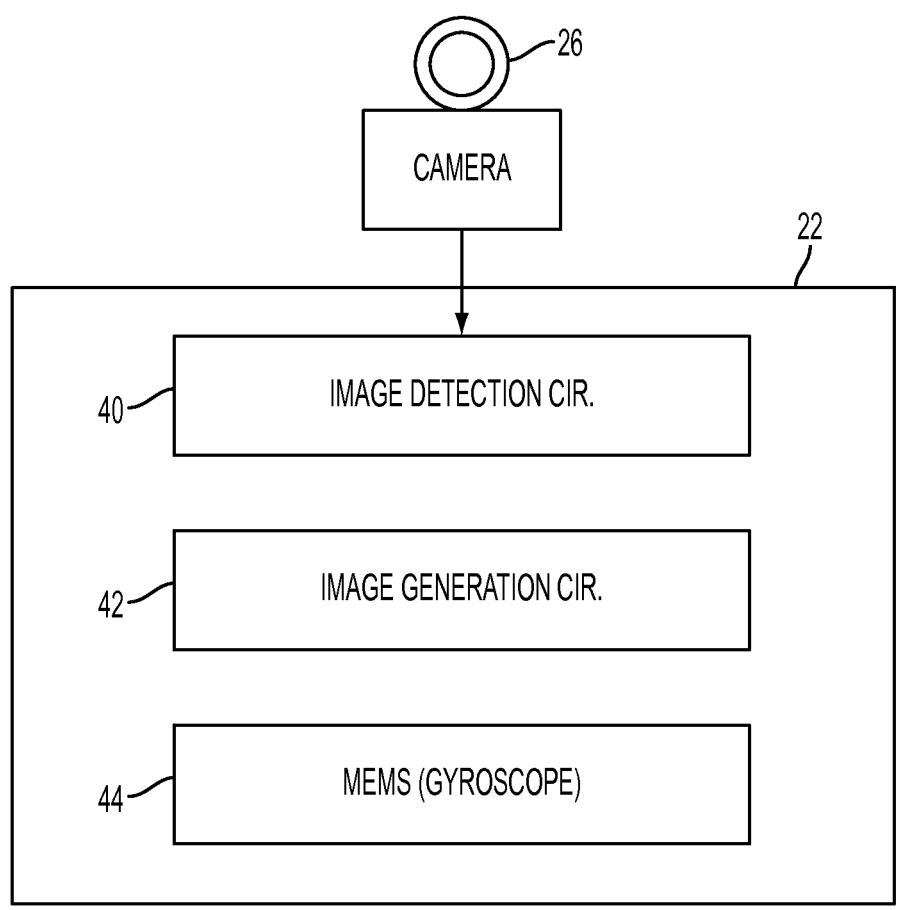
FIG. 3 illustrates another example of any of the devices of FIG. 1 using the implementation of FIG. 2, according to an example embodiment.

FIG. 3 illustrates in further detail an apparatus (i.e., machine) implemented using the implementation of FIG. 2. Any of the devices 12, 14, and/or 18 can implement the disclosed mirroring of the distorted view of the participant image using a distorted image of the presenter as feedback to the participant. In one embodiment, each user device 12 can include the camera 26. Each device 12, 14, and/or 18 can implement, by the corresponding processor circuit 22, an image detection circuit 40 and an image generation circuit 42. The image detection circuit 40 and image generation circuit 42 also can be implemented in different forms, for example as executable logic encoded in one or more non-transitory tangible media for execution by a machine (e.g., the processor circuit 22).

Each user device 12 also can include a microelectromechanical system (MEMS) circuit (e.g., a gyroscope) 44, implemented either within the processor circuit 22 or distinct from the processor circuit 22. The MEMS circuit 44 can be configured for detecting the positional orientation of the corresponding device 12, including changes in the positional orientation due to movement of the device 12 by the user.

As described below, the image detection circuit 40 (implemented within any one of the devices 12, 14, and/or 18) can determine that a participant image has a distorted view relative to an optimized view of a participant within a corresponding participant image frame for a web-based videoconference with a presenter. The image generation circuit 42 can be configured for sending, to a display 34 of the participant device 12 having generated the participant image, a distorted image of the presenter 30 corresponding to the distorted view in the participant image frame, enabling the participant to adjust the device to minimize the distorted view.

Any of the disclosed circuits in the devices 12, 14, and/or 18 (including the network interface circuit 20, the memory circuit 24, the processor circuit 22, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 24) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 24 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a tangible memory medium in the disclosed apparatus (e.g., in a receive buffer). Also note that the memory circuit 24 can be implemented dynamically by the processor circuit 22, for example based on memory address assignment and partitioning executed by the processor circuit 22.

Figure 4:
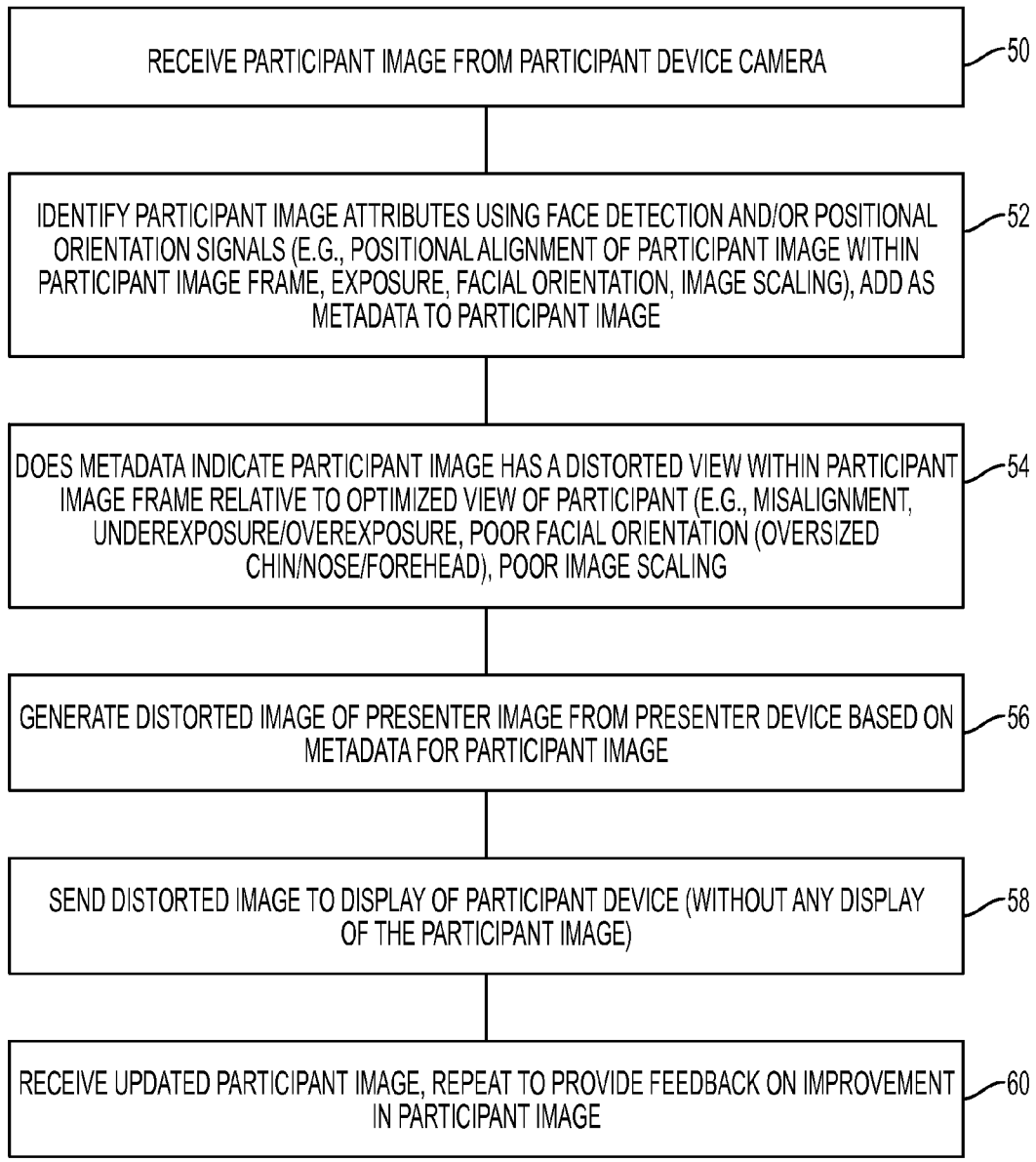
FIG. 4 illustrates an example method of optimizing the participant image based on sending a distorted image of the presenter, according to an example embodiment.

FIG. 4 illustrates an example method of optimizing the participant image based on sending a distorted image of the presenter, according to an example embodiment. The operations described with respect to FIGS. 1-5 can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media (e.g., programmable logic arrays or devices, field programmable gate arrays, programmable array logic, application specific integrated circuits, etc.) for execution by a machine.

In addition, the operations described with respect to any of the FIGS. 1-5 can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

In one embodiment, the operations of FIG. 4 can be executed within a presenter device, for example the device 12a of FIG. 1. In another embodiment, the operations of FIG. 4 can be executed locally within a participant device (e.g., 12b, 12c, 12d) for the corresponding participant. In another embodiment, the operations of FIG. 4 can be executed in the meeting server 14 and/or the access device 18.

Referring to operation 50, the image detection circuit 40 executed by the processor circuit 22 can receive a participant image (e.g., for participant "C") from the participant image camera 26: assuming the operations are executed locally within a participant device having generated the participant image, the participant image can be received from the local camera 26 as a local media stream or a "snapshot" image; if the operations are executed by a remote device (e.g., the presenter device 12a, the meeting server device 14, and/or the access device 18), the participant image can be received from the remote participant device (e.g., 12b, 12c, and/or 12d) with an identifier that identifies the corresponding remote participant.

The image detection circuit 40 executed by the processor circuit 22 within the relevant device (e.g., the local participant device 12b/c/d having generated the participant image or a remote device 12a, 14, or 18) can identify an operation 52 attributes associated with the participant image using face detection techniques and/or positional orientation signals. For example, the image detection circuit 40 can identify the positional alignment of the participant image within the corresponding participant image frame to determine whether the participant image is properly centered within the participant image frame, or whether the participant image is misaligned within the participant image frame; the image detection circuit 40 also can identify the exposure of the participant image to determine whether the participant image is overexposed or underexposed relative to the prescribed optimized view, for example based on a histogram analysis of the participant image; the image detection circuit 40 also can determine whether the participant image has the appropriate facial orientation, where the face of the participant is aligned with the camera 26 to provide a well proportioned image of the participant; the image detection circuit 40 also can determine whether the participant image has the appropriate image scaling indicating that the participant is at the proper distance from the corresponding camera 26 as opposed to too close (resulting in a zoomed in view of the participant's nose) or too far (resulting in a too-small image of the participant).

The image detection circuit 40 in operation 52, in response to identifying the participant image attributes described above, adds metadata describing the participant image attributes either to the participant image or as a distinct data file associated with the participant image.

The image detection circuit 40 in operation 54 can determine from the metadata whether the participant image has a distorted view within the corresponding participant image frame relative to an optimized view of the participant. Hence, the image detection circuit 40 in operation 54 can determine whether the participant image has a distorted view due to misalignment relative to the participant image frame, underexposure or overexposure, a poor facial orientation that creates an image of an oversized chin (due to the device camera 26 held too low relative to the participant's face), an oversized nose (due to the device camera 26 held too close to the participant's face), an oversized forehead (due to the device camera 26 held too high relative to the participant's face), or whether the participant image has a distorted view due to poor image scaling (due to the device camera 26 being held too close or too far from the participant's face).

In response to the image detection circuit 40 determining that the participant image has a distorted view within the corresponding participant image frame relative to an optimized view of the participant, the image generation circuit 42 can generate in operation 56 a distorted image of the presenter image received from the presenter device (e.g., 12a). In particular, the image generation circuit 42 in operation 56 can generate the distorted image of the presenter based on the metadata for the participant image, and send the distorted image of the presenter in operation 58 to the display 34 of the participant device, such that the distorted image is sent without any display of the participant image. Examples of a distorted image of the presenter corresponding to the distorted view of the participant image are described below with respect to FIGS. 5A-5E.

Hence, the distorted image of the presenter that is sent to the display 34 of the participant device (e.g., 12b, 12c, or 12d) enables the participant to adjust the corresponding device to minimize the distorted view. In response to the processor circuit 22 receiving in operation 60 an updated participant image (and/or detected positional information generated by a MEMS circuit 44), the processor circuit 22 can repeat operations 52 through 58 of FIG. 4 in order to provide feedback to the participant as the participant image is improved based on improving the distorted image of the presenter that is sent to the display 34.

FIGS. 5A-5E illustrate different examples of distorted images that can be generated by the image generation circuit 42 from the optimized view 28 of the presenter 30, according to an example embodiment.

FIG. 5A illustrates generating and sending distorted images 62 of the presenter 30 based on misalignment of the participant image within the corresponding image frame. The distorted image 62a of the presenter 30 can be generated and sent to the display 34 of the participant device (e.g., 12*c*) at event 100 in response to detecting the participant image (e.g., of participant "C") is misaligned toward the left edge of the participant frame due to the right side of the user device being tilted back away from the participant: the image generation circuit 42 at event 102 can provide feedback to the participant based on sending the optimized view 28 of the presenter 30 as the participant tilts the right side of the device (e.g., 12*c*) forward to center the participant image within the participant image frame. Similarly, the distorted image 62*b* can be sent at event 104 in response to detecting the participant image is misaligned toward the right edge of the participant frame due to the left side of the user device (e.g., 12*c*) being tilted back away from the participant: the image generation circuit 42 at event 106 can provide feedback to the participant based on sending the optimized view 28 as the participant tilts the left side of the device forward to center the participant image within the participant image frame.

The distorted image 62*c* can be generated and sent to the display 34 of the participant device in response to detecting that the participant image is misaligned toward the lower edge of the participant frame due to the top edge of the participant device being tilted away from the participant: the image generation circuit 42 at event 110 can provide feedback to the participant based on sending the optimized view 28 as the user tilts the top edge of the participant device (e.g., 12*c*) forward. Similarly, the distorted image 62*d* is generated and sent at event 112 in response to detecting that the participant images misaligned toward the upper edge of the participant frame due to the bottom edge of the participant device being tilted away from the participant: the image generation circuit 42 at event 114 can provide feedback to the participant based on sending the optimized view 28 as the participant tilts the bottom edge of the participant device forward.

Hence FIG. 5A illustrates how the distorted images 62*a*, 62*b*, 62*c*, and 62*d* of the presenter 30 can enable the participant to adjust the participant device to minimize the distorted view of the participant. The distorted images also can be combined, as needed, for two-dimensional adjustments (e.g., diagonal adjustments).

Figure 5B:
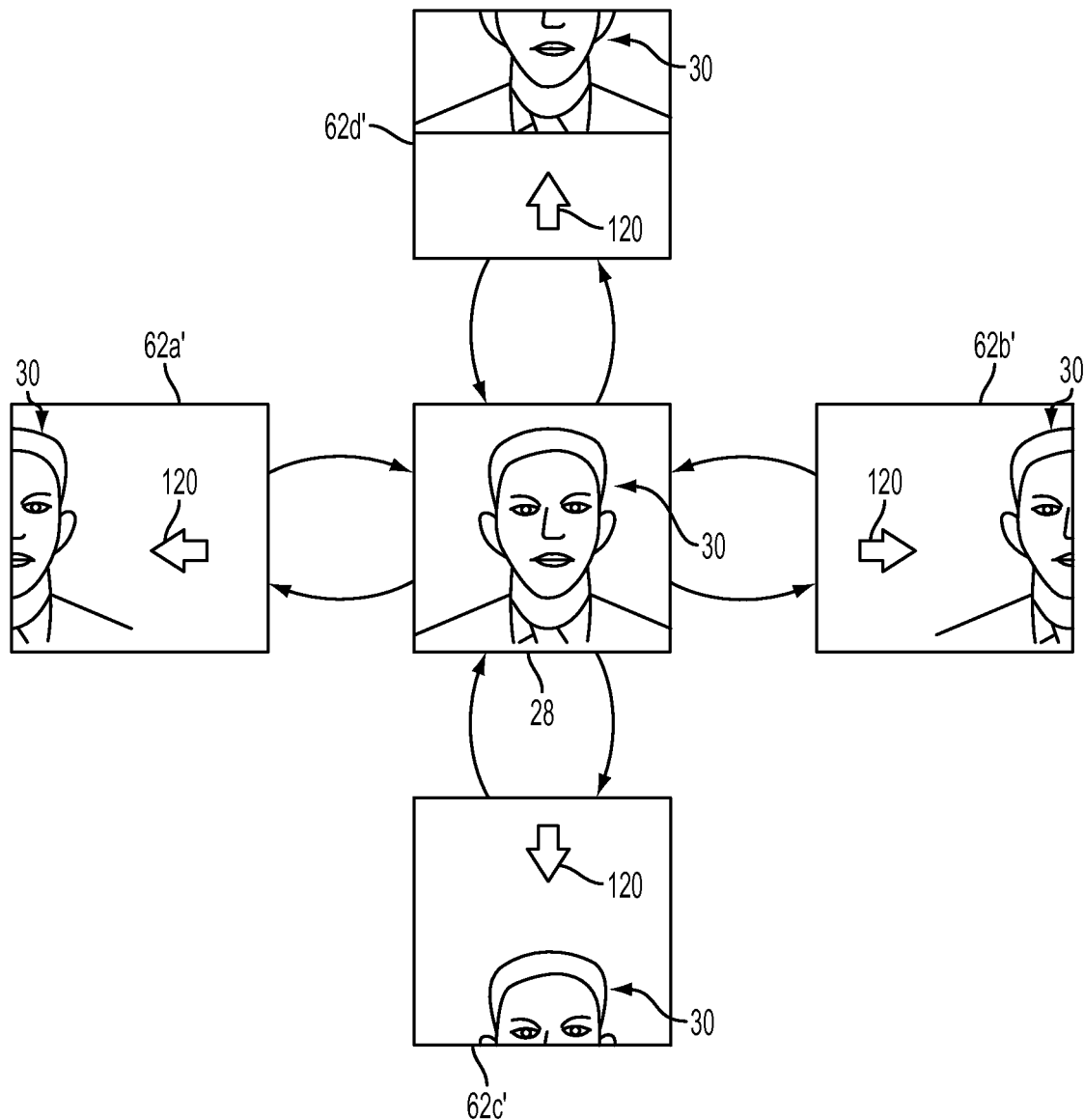
Figure 5C:
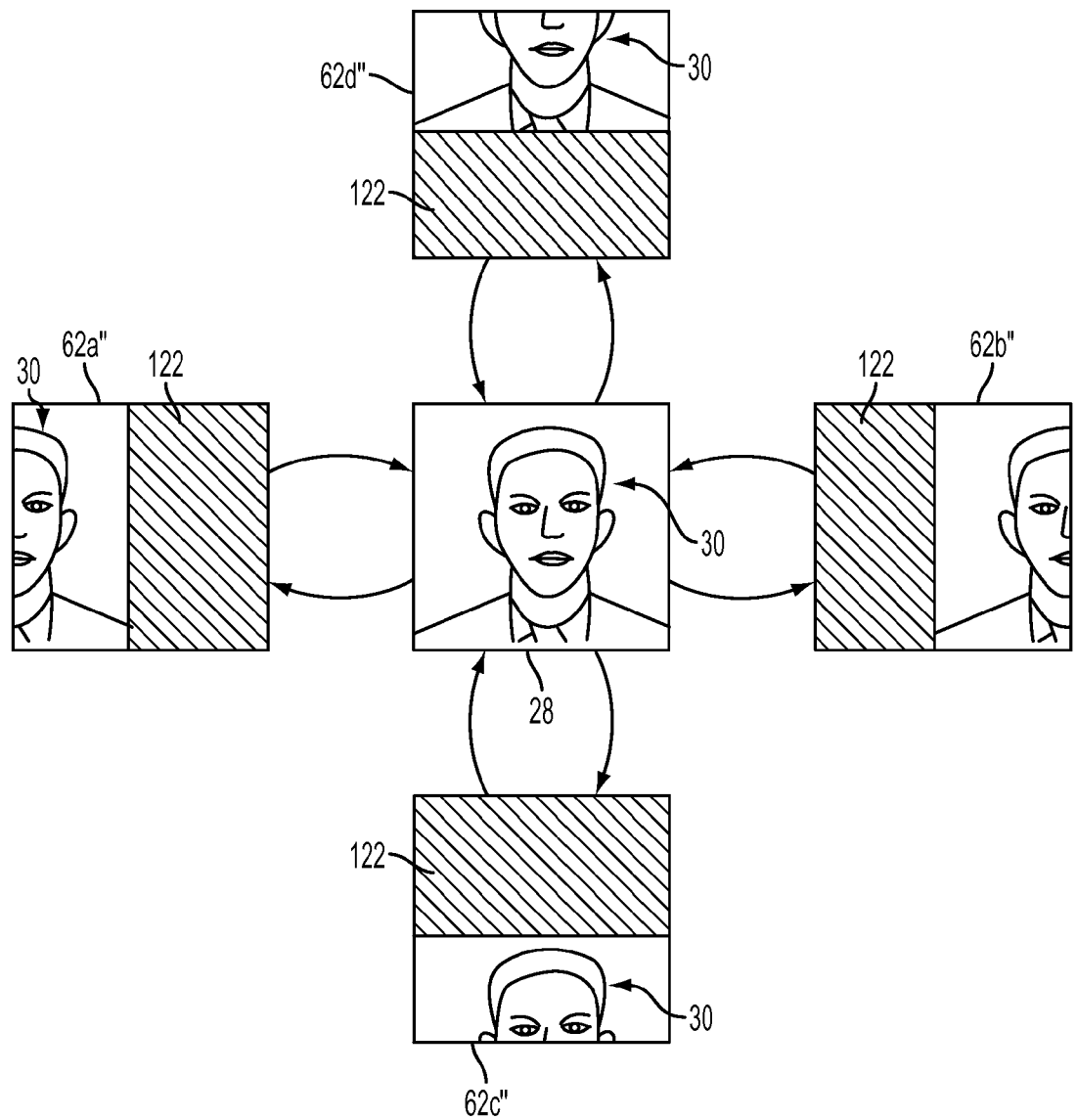
Figure 5D:
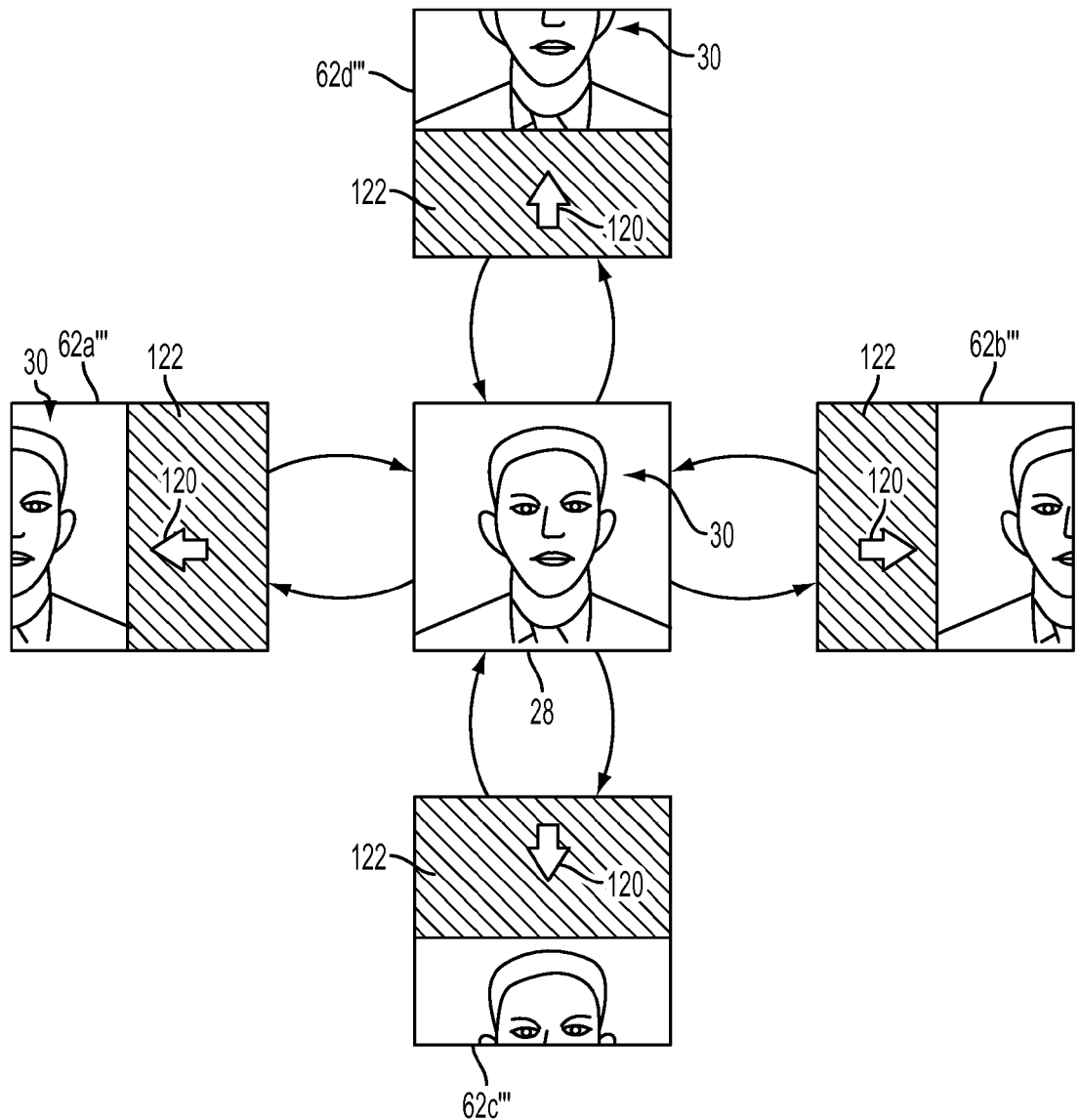

FIG. 5B illustrates another example of distorted images 62*a*', 62*b*', 62*c*', and 62*d*' of the presenter, where the image generation circuit 42 can add directional indicators 120 providing additional information as to the direction that the participant device needs to be moved in order to minimize the distorted view. The directional indicators 120 can be particularly effective if the distortion is so severe that the user cannot readily determine the proper direction. FIG. 5C illustrates another example of distorted images 62*a*'', 62*b*'', 62*c*'' and 62*d*'' using border indicators 122 instead of directional indicators 120, and FIG. 5D illustrates another example of distorted images 62*a*''', 62*b*''', 62*c*''', and 62*d*''' using a combination of the directional indicators 120 and the border indicators 122.

Figure 5E:
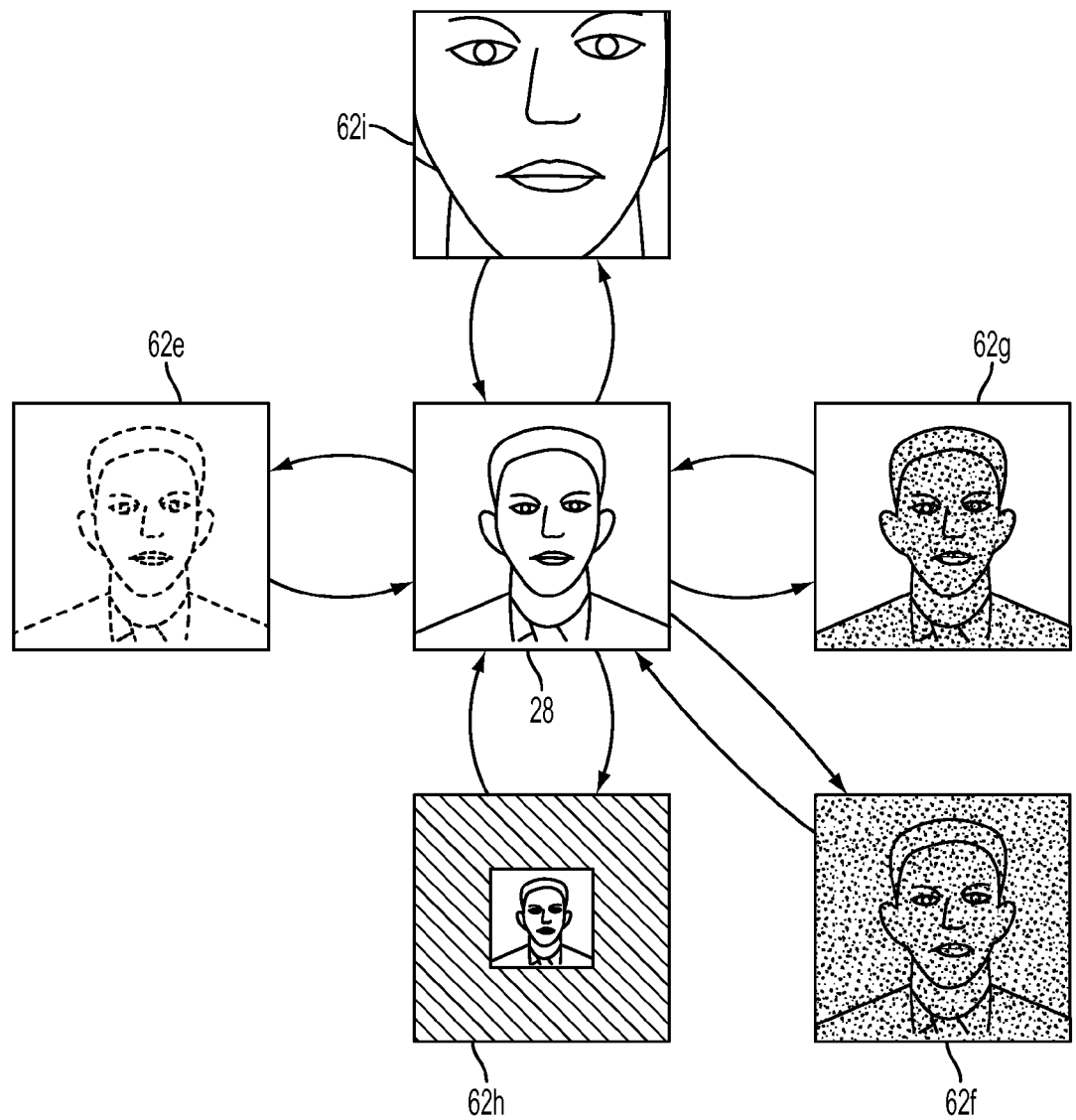

FIG. 5E illustrates another example of distorted images 62*e*, 62*f*, 62*g*, 62*h*, and 62*i* based on distorted views of the participant that are based on factors other than alignment of the participant device (e.g., 12*c*). For example, the distorted image 62*e* of the presenter 30 is generated in response to a determined overexposure of the participant image; the distorted image 62*f* of the presenter 30 is generated in response to a determined underexposure of the participant image and the participant image frame; the distorted image 62*g* of the presenter 30 is generated in response to a determined overexposure of the participant image relative to the background of the participant, in other words a "washout" of the participant image due to erroneous exposure compensation relative to the bright background. The distorted image 62*h* of the presenter 30 is generated in response to the participant device (e.g., 12*c*) being held too far away from the participant, and the distorted image 62*i* of the presenter 30 is generated in response to the participant device (e.g., 12*c*) being held too closely to the face of the participant. As described previously with respect to FIG. 5A, the optimized image 28 can be sent to the display 34 of the participant device in response to the participant correcting the associated errors.

According to example embodiments, feedback can be sent to participant devices to optimize the video quality of participant images, without the necessity of displaying the participant image that could otherwise distract the participant, as participants can tend to watch themselves; further, the ability to optimize the video quality of participant images using the presenter image without displaying the participant image frees up valuable real estate on the display of smaller participant devices. Further, use of the presenter image as feedback for minimizing the distorted view of a participant image is particularly effective as participants generally will be motivated to optimize the view of the presenter in order to obtain a better experience in consuming the content offered by the presenter of the web-based video conference.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   receiving an optimized view of a presenter centered within a presenter image frame and having been generated by a presenter device;
   determining that a participant image, generated by a participant device, has a distorted view relative to an optimized view of a participant within a corresponding participant image frame for a web-based videoconference with the presenter;
   generating, from the optimized view of the presenter, a distorted image of the presenter having a distortion corresponding to the distorted view of the participant image in the corresponding participant image frame; and
   sending, to a display of the participant device having generated the participant image, the distorted image of the presenter corresponding to the distorted view of the participant in the participant image frame, enabling the participant to adjust the participant device to minimize the distorted view in the participant image frame.

2. The method of claim 1, wherein the determining that the participant image has the distorted view is based on at least one of face detection of the participant, or a detected positional orientation of the participant device generating the participant image.

3. The method of claim 2, wherein the detected positional orientation is based on orientation signals output by a micro-electromechanical system (MEMS) circuit in the participant device.

4. The method of claim 1, wherein the determining, generating and sending is executed by any one of:
   the presenter device used by the presenter for the web-based videoconference,
   a meeting server device configured for establishing and maintaining the videoconference between the presenter device and the participant device having generated the participant image, or the participant device having generated the participant image.

5. The method of claim 1, wherein the display of the participant device displays the distorted image of the presenter without any display of the participant image.

6. The method of claim 1, further comprising providing feedback to the participant as the participant image is improved by the participant device based on improving the distorted image of the presenter sent to the display, relative to a corresponding detected improvement in the participant image relative to the optimized view in the participant image frame.

7. The method of claim 1, wherein the distorted view is based on any one of a misalignment of the participant image relative to the participant image frame, underexposure of the participant image, overexposure of the participant image, poor facial orientation of the participant within the participant image, or poor image scaling of the participant within the participant image relative to the participant image frame.

8. An apparatus comprising:
  image detection circuitry configured for determining that a participant image, generated by a participant device, has a distorted view relative to an optimized view of a participant within a corresponding participant image frame for a web-based videoconference with a presenter; and
  image generation circuitry configured for receiving an optimized view of the presenter centered within a presenter image frame and having been generated by a presenter device;
  the image generation circuitry further configured for generating, from the optimized view of the presenter, a distorted image of the presenter having a distortion corresponding to the distorted view of the participant image in the corresponding participant image frame;
  the image generation circuitry further configured for sending, to a display of the participant device having generated the participant image, the distorted image of the presenter corresponding to the distorted view of the participant in the participant image frame, enabling the participant to adjust the participant device to minimize the distorted view in the participant image frame.

9. The apparatus of claim 8, wherein the image detection circuitry is configured for determining that the participant image has the distorted view based on at least one of face detection of the participant, or a detected positional orientation of the participant device generating the participant image.

10. The apparatus of claim 9, further comprising a microelectromechanical system (MEMS) circuit configured for generating orientation signals in response to the detected positional orientation of the apparatus.

11. The apparatus of claim 8, wherein the apparatus is implemented within any one of:
  the presenter device used by the presenter for the web-based videoconference,
  a meeting server device configured for establishing and maintaining the videoconference between the presenter device and the participant device having generated the participant image, or
  the participant device having generated the participant image.

12. The apparatus of claim 8, wherein the display of the participant device is configured for displaying the distorted image of the presenter without any display of the participant image.

13. The apparatus of claim 8, wherein the image generation circuitry is configured for providing feedback to the participant as the participant image is improved by the participant device based on improving the distorted image of the presenter sent to the display, relative to a corresponding detected improvement in the participant image relative to the optimized view in the participant image frame.

14. The apparatus of claim 8, wherein the distorted view is based on any one of a misalignment of the participant image relative to the participant image frame, underexposure of the participant image, overexposure of the participant image, poor facial orientation of the participant within the participant image, or poor image scaling of the participant within the participant image relative to the participant image frame.

15. Logic encoded in one or more non-transitory tangible media for execution and when executed by a machine operable for:
  receiving an optimized view of a presenter centered within a presenter image frame and having been generated by a presenter device;
  determining that a participant image, generated by a participant device, has a distorted view relative to an optimized view of a participant within a corresponding participant image frame for a web-based videoconference with the presenter;
  generating, from the optimized view of the presenter, a distorted image of the presenter having a distortion corresponding to the distorted view of the participant image in the corresponding participant image frame; and
  sending, to a display of the participant device having generated the participant image, the distorted image of the presenter corresponding to the distorted view of the participant in the participant image frame, enabling the participant to adjust the participant device to minimize the distorted view in the participant image frame.

16. The logic of claim 15, wherein the determining that the participant image has the distorted view is based on at least one of face detection of the participant, or a detected positional orientation of the participant device generating the participant image.

17. The logic of claim 16, wherein the detected positional orientation is based on orientation signals output by a microelectromechanical system (MEMS) circuit in the participant device.

18. The logic of claim 15, wherein the display of the user participant device displays the distorted image of the presenter without any display of the participant image.

19. The logic of claim 15, further operable for providing feedback to the participant as the participant image is improved by the participant device based on improving the distorted image of the presenter sent to the display, relative to a corresponding detected improvement in the participant image relative to the optimized view in the participant image frame.

20. The logic of claim 15, wherein the distorted view is based on any one of a misalignment of the participant image relative to the participant image frame, underexposure of the participant image, overexposure of the participant image, poor facial orientation of the participant within the participant image, or poor image scaling of the participant within the participant image relative to the participant image frame.

* * * * *